United States Patent [19]
Byrd

[11] Patent Number: 5,923,465
[45] Date of Patent: *Jul. 13, 1999

[54] SYSTEM FOR SCANNING CONFOCAL IMAGE RECONSTRUCTION FROM COHERENT RECORDINGS

[75] Inventor: Marc J. Byrd, 2815 N. Belgravia, Pearland, Tex. 77584-2232

[73] Assignee: Marc J. Byrd, Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/862,669

[22] Filed: May 23, 1997

Related U.S. Application Data

[63] Continuation of application No. 08/330,873, Oct. 28, 1994, abandoned.

[51] Int. Cl.$^6$ .................................................. G03H 1/08
[52] U.S. Cl. ......................... 359/368; 359/369; 359/370; 359/13; 359/30; 359/29; 359/32
[58] Field of Search ..................................... 359/368, 369, 359/370, 13, 30, 77, 19, 29, 32, 15, 33, 569

[56] References Cited

U.S. PATENT DOCUMENTS

| | | | |
|---|---|---|---|
| 3,013,467 | 12/1961 | Minsky | 88/14 |
| 3,508,208 | 4/1970 | Duguay et al. | 340/173 |
| 3,764,979 | 10/1973 | Gabor | 340/146.3 P |
| 4,367,648 | 1/1983 | Sinclair et al. | 73/620 |
| 4,784,147 | 11/1988 | Moshfeghi | 128/653 |
| 4,844,617 | 7/1989 | Kelderman et al. | 356/372 |
| 4,917,486 | 4/1990 | Raven et al. | 351/221 |
| 5,054,926 | 10/1991 | Dabbs et al. | 356/345 |
| 5,161,053 | 11/1992 | Dabbs | 359/384 |
| 5,166,615 | 11/1992 | Sidles | 324/307 |
| 5,229,619 | 7/1993 | Amstel | 250/560 |
| 5,289,407 | 2/1994 | Strickler et al. | 365/106 |
| 5,426,521 | 6/1995 | Chen et al. | 359/32 |

*Primary Examiner*—Cassandra Spyrou
*Assistant Examiner*—Mohammad Y. Sikder
*Attorney, Agent, or Firm*—Vinson & Elkins L.L.P.

[57] ABSTRACT

A method for improving the resolution and contrast of images associated with coherent recording is presented, which includes conventional reconstruction with a reference wave followed by re-imaging the intermediately formed image through a system based on techniques from confocal microscopy. This method provides the opportunity to bring the benefits of the optical confocal microscope, namely resolution, contrast improvement, and the accompanying three-dimensional visualization, to such diverse imaging regimes as infrared, X-ray, ultraviolet, as well as other wave propagation systems such as seismic, sonar and ultrasound imaging. In addition, through snap-shot acquisition of said coherent recordings, the capability of time resolution may be added, thus adding functionality in wavelength regions where the confocal microscope currently operates.

17 Claims, 8 Drawing Sheets

SYSTEM FOR SCANNING CONFOCAL IMAGE RECONSTRUCTION FROM COHERENT RECORDINGS

RELATED APPLICATIONS

This application is a continuation of application Ser. No. 08/330,873, filed Oct. 28, 1994, and entitled, "SYSTEM FOR SCANNING CONFOCAL IMAGE RECONSTRUCTION FROM COHERENT RECORDINGS," now abandoned.

FIELD OF THE INVENTION

The present invention pertains to coherent recordings; more particularly, the present invention pertains to a system for improving the resolution and contrast of images obtained by coherent recording of energy waves.

BACKGROUND

Energy is transmitted by waves. Patterns in transmitted energy waves are used to form images of the object from which the energy waves originate. Energy waves in the form of light enable the formation of the visual image of an object by the human eye. Non-optical energy waves may also be used to form images of objects such as the imaging of underground mineral deposits with seismic wave patterns.

In order to obtain an accurate representation of the object being imaged, it has become necessary to develop techniques to improve the resolution and contrast of the images produced by recording wave patterns. These techniques have been applied to the coherent recording of wave patterns produced over the spectrum of recognizable energy waves. However, for simplicity of disclosure, the following description will center on light waves. More specifically, and for the purpose of illustrating the improvement in the coherent recording of wave patterns, the following disclosure will center on holography and the production of holographic images using holograms.

In recent years, holographic techniques have been used with light energy waves to produce holographic images. While holography has added new dimensions to the imaging of objects, it is not without its problems.

The original and most basic form of holography, the in-line or Gabor type, has the distinct advantage that it requires no lenses or mirrors.

One of the main detractors from the quality of in-line holographic images is the so-called "twin image" problem. The twin image problem appears when one image in the reconstruction of a virtual holographic image is confused by the out-of-focus twin image. Despite the twin image problem, in-line holograms have achieved limited acceptance, particularly in areas involving the sizing of small particles and velocimetry, such as in examining turbulent flow patterns of liquids. However, to be able to expand on the tremendous imaging potential offered by holographic techniques, there remains in the art a need to improve upon the resolution and contrast of all types of holographic images.

One attempt at resolving the problem of the lack of acceptable resolution and contrast in holographic images involves digitizing the hologram and then using digital reprocessing techniques to improve the resolution and contrast of the reconstructed hologram. The drawback to such digital reprocessing techniques is that an a priori knowledge of the subject is required. Thus, if prior knowledge of the subject is nonexistent, such digital reprocessing techniques are useless.

Therefore, a need remains in the art to find a system for improving, in particular, the resolution and contrast problems associated with making maximum use of holographic imaging techniques; but, more generally, to improve the resolution and contrast of images associated with coherent recordings created by a variety of other energy waves.

SUMMARY OF THE INVENTION

The system for scanning confocal image reconstruction from coherent recordings of the present invention provides a method for improving the resolution and contrast of a holographic image; in particular, and more generally, the resolution and contrast of coherent recordings of energy wave patterns. While having broad applicability, the present invention is explained in terms of its impact on holography. Specifically, a confocal holographic image reconstruction system is disclosed which involves reconstructing a holographic image by use of techniques which emulate the confocal microscope.

The system of the present invention for reconstructing a holographic image includes replacing the objective lens in a confocal microscopy system with a hologram. The hologram is then placed in the confocal microscopy system so that the holographic image replaces the object normally viewed using confocal microscopy techniques. This virtual object, hereinafter referred to as the intermediate image, is then reconstructed through a system based on confocal microscopy techniques, producing otherwise unavailable improved resolution and contrast.

BRIEF DESCRIPTION OF THE DRAWINGS

A better understanding of the system for scanning confocal image reconstruction from coherent recordings of the present invention may be had from the drawings, wherein.

DESCRIPTION OF THE EMBODIMENTS

Background on Holography

Figure 1:
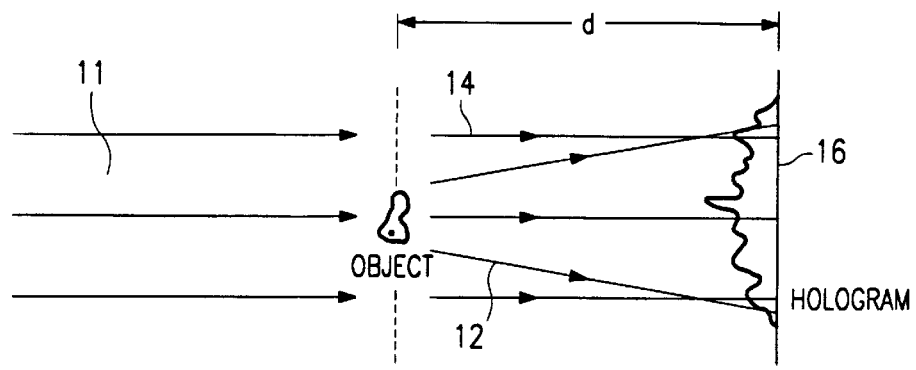
FIG. 1 is a schematic diagram of a conventional Gabor in-line hologram formation.

FIG. 1 shows the conventional configuration for the formation of a hologram. For illustrative simplicity, the Gabor geometry for the formulation of in-line holograms is shown. Those of ordinary skill in the art will understand that the system for scanning confocal image reconstruction from coherent recordings disclosed herein can be applied to other geometries for forming holographic images.

In FIG. 1, a coherent plane wave 11 is incident upon a sparse, small, and/or semitransparent object. The diffracted wave field 12 from the object interferes with the undiffracted incident wave 14, forming an in-line, lensless hologram 16. The distance between the plane of the object and the recording plane of the hologram 16 is denoted by the letter "d."

Figure 2:
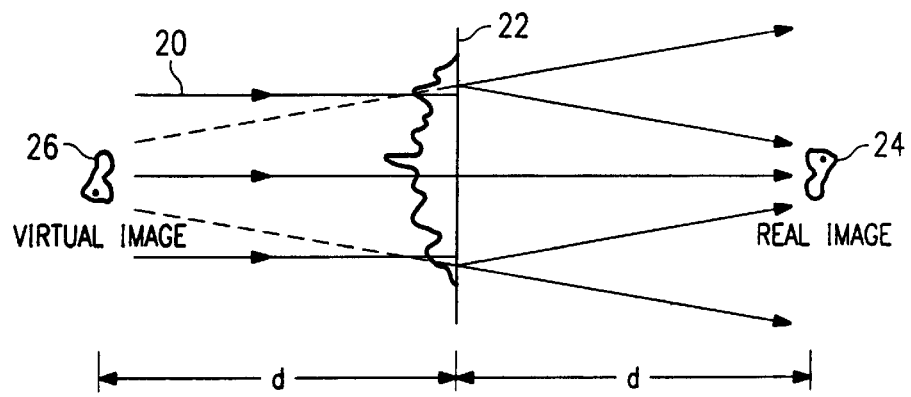
FIG. 2 is a schematic diagram of a conventional Gabor in-line hologram reconstruction.

FIG. 2 shows the holographic image reconstruction geometry. A plane wave 20, identical to the illuminating wave, re-illuminates and is diffracted by the hologram 22 and produces two images 22 and 24 located at a distance d on either side of hologram 22. A virtual image 26 is formed in the original object location and orientation while the real image 24, formed to the right of the hologram 22, is inverted and pseudo-scopic; i.e., it is a phase-conjugated version of the original object. Because in Gabor holograms images 22 and 24 are in line, they cannot be viewed separately. This results in the so-called "twin image" problem wherein one image in the reconstruction is confused by the out-of-focus twin image.

In spite of this "twin image" problem, in-line holography techniques have been used successfully to investigate small particle sizing and velocimetry such as in imaging droplet flow patterns in turbulent liquid flows.

Background on Confocal Microscopy Techniques

Figure 3A:
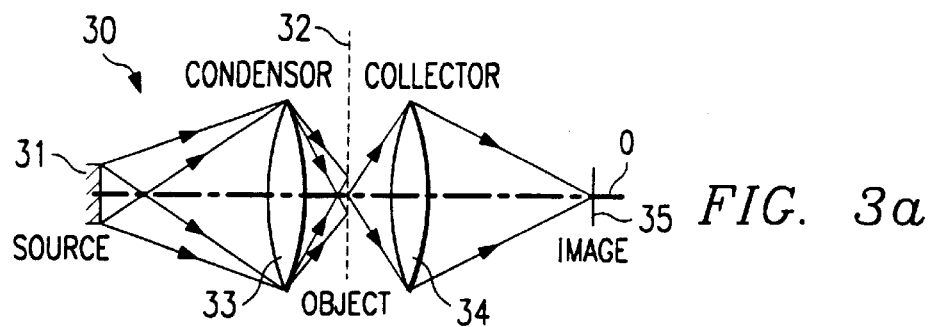
FIGS. 3a, 3b, 3c and 3d are schematic optical diagrams of various microscopy techniques.
Figure 3B:
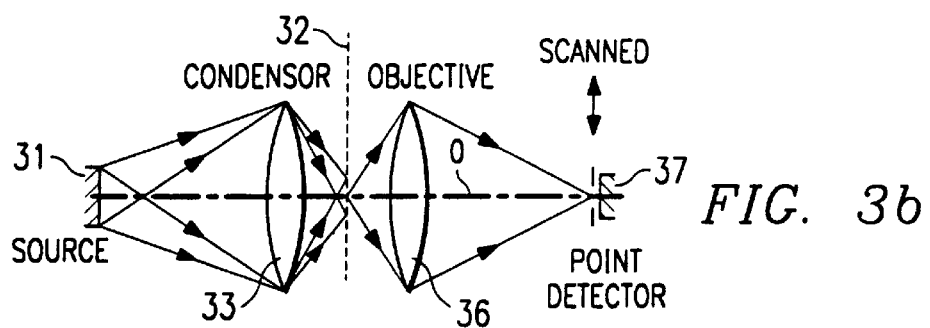
Figure 3C:
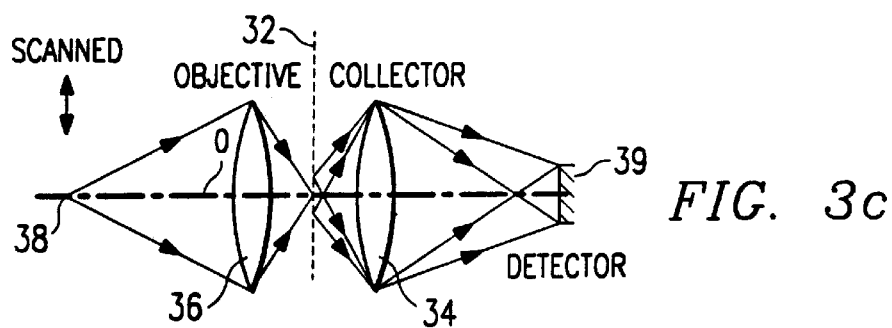
Figure 3D:
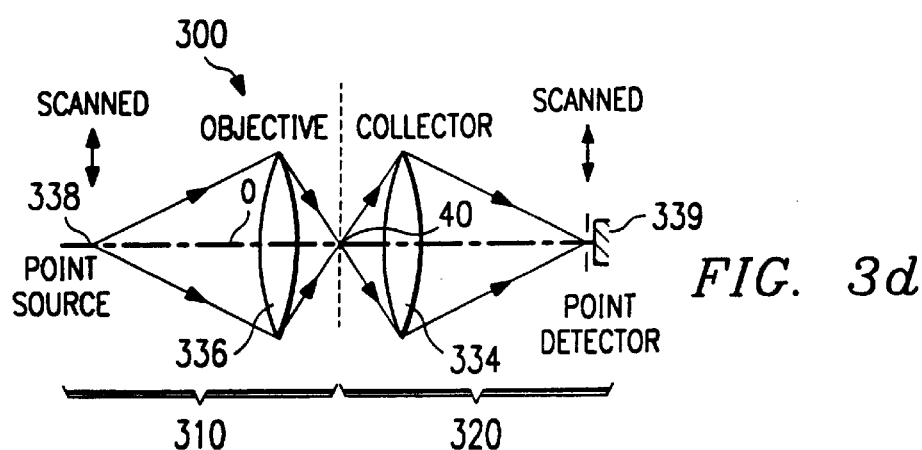

FIGS. 3a, 3b, 3c and 3d show schematic diagrams which illustrate a variety of microscope configurations from the conventional microscope 30 in FIG. 3a to the scanning confocal microscope 300 shown in FIG. 3d. In FIG. 3a, a spatially diverse (as opposed to well-focused) light source 31 is imaged onto a specimen at an object plane 32 through a condenser lens 33, forming a flood of illumination in the area around the optical axis "o". Points both on and off the optical axis "o" are imaged through the collector lens 34, with apparent locations determined by geometric optics, although they may suffer some image aberration due to imperfections in the objective.

To solve the problem of aberrations in the image 35 produced by a conventional microscope 30, other scanning methods to view specimens have been developed. Two of these other scanning methods are presented in FIGS. 3b and 3c. In FIG. 3b, a collector lens 34 has been replaced with objective lens 36 and the image of the specimen being viewed is formed by scanning the aligned point detector 37. In FIG. 3c, the arrangement shown in FIG. 3b is inverted. Specifically, the point illumination source 33 is scanned, and the image of the specimen appears on a spatially diverse detector 39. The methods shown in FIGS. 3b and 3c use the least aberrated point in the image field of either the collector 34 or the condensing lens 33 separately for every point in the reconstructed image.

The scanning confocal microscope 300, displayed in FIG. 3d for comparison purposes to more conventional microscopy devices, differs in that both the irradiating 310 and the collecting 320 systems are aligned to have overlapping foci at the point of interest 40 in the object space. A single point or small region defined by a beam waist in the object distribution is illuminated by a point source 338 through the objective lens 336. When precise alignment is achieved, light from the same single point in the object is collected and re-imaged at the point detector 339 through the collector lens 334. An image is built up point by point by either scanning the object through the confocal point or vice-versa.

Improved Holographic Image Reconstruction with Confocal Microscopy Techniques—Collimated Version In order to improve the resolution, particularly in depth, of a holographic image, and thus improve image contrast, it has been found that re-imaging or reconstructing an intermediately formed holographic image using confocal microscopy techniques produces the desired result. Specifically, improved resolution and contrast of an intermediately formed image is achieved by an optical system which includes the steps of hologram formation, illumination of the hologram by a reference wave, and collimation of the virtual image rays from the object plane by a lens whose focal length is equal to the hologram recording distance. This wave front is propagated at a distance sufficient to reject waves originating from other planes, similar to the operating principle of a confocal microscope. The wave field is then re-imaged or reconstructed, which yields a confusionless view of the intermediately formed holographic image at the plane of interest.

To further illustrate the confocal reconstruction of an intermediately formed holographic image, the in-line hologram of a point scatterer is recognized as a zone plate. The spherical wave from the point scatterer is coherently mixed with a planar reference wave. The resulting holographic image is a recording of the intensity of the amplitude of the resultant wave. The in-line hologram at the zone plate may also be considered a special lens, since upon re-illumination of the hologram by the reference wave, positive and negative foci result. If the holographic image at the zone plate is aligned such that one of these foci overlaps with the focus of another lens or a system of lenses, then the arrangement is termed "confocal."

When a second point is added to the object distribution, a more complicated in-line hologram results. The complex amplitude at the hologram recording plane is the coherent sum of the reference wave and the two spherical waves diffracted from each of the points. The resultant hologram can then be positioned such that one of the reconstructed points is confocal to the remainder of the imaging system. As a general hologram is the summation of many holographic zone plates, general object distributions may be considered as collections of point scatterers and their holograms may be considered as the square of the magnitude of the coherent superposition of many zone-plate type distributions.

Figure 4:
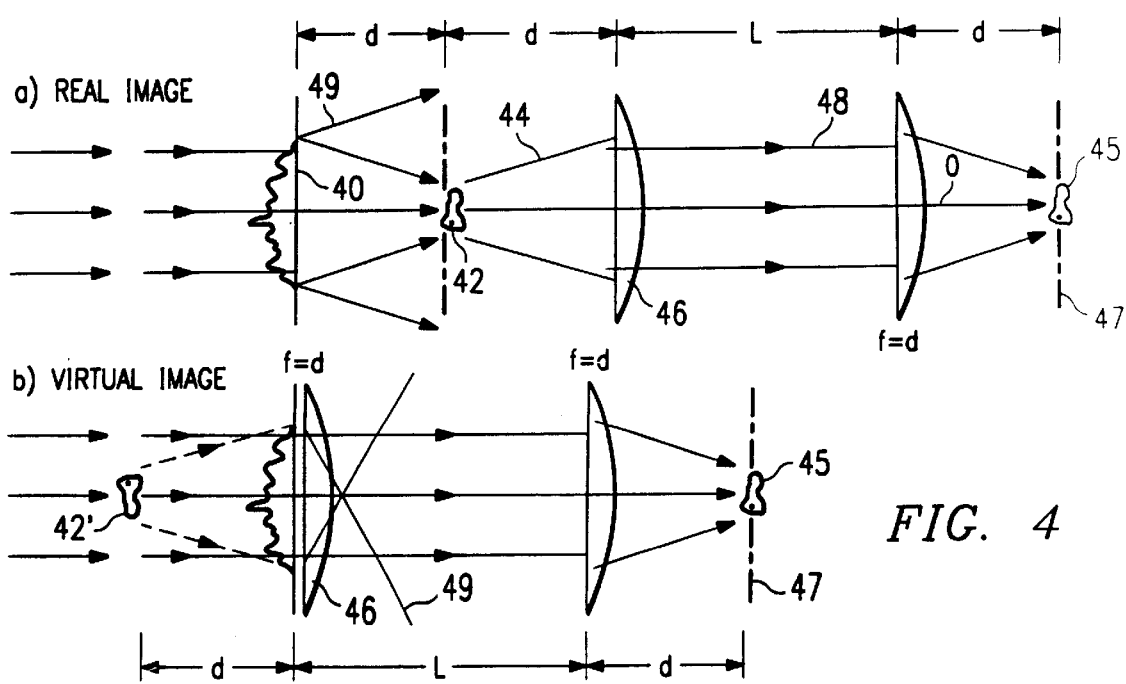
FIG. 4 is a schematic diagram of a confocal hologram reconstruction system.

Two geometries for collimated confocal hologram reconstruction are shown in FIGS. 4a and 4b. The geometry shown in FIG. 4a reconstructs an intermediately formed real image, while the geometry shown in FIG. 4b reconstructs an intermediately formed virtual image.

To understand the analogy between the confocal hologram reconstruction and a confocal microscope, compare FIG. 4a with the conventional confocal microscope 300 found in FIG. 3d. The left-most objective lens 336 in FIG. 3d is replaced by the hologram 40 which, in a sense, is a combination of superimposed zone plate lenses for the objects. If the hologram 40 is aligned appropriately, an image 42 is formed in the input focal plane 44 of the relay imaging system. This image 42 replaces the object in the scanning confocal microscope 300 illustrated in FIG. 3d. As the focal length "f" of the left-most lens 46 approaches d, the built-in focal length of the hologram 40 for a particular object plane, collimated rays 48 result from the object at the plane of interest, while rays 49 from other planes eventually exit the system. After a sufficient distance L, the collimated light is re-imaged to form a clean view 45 of the object, similar in depth of field to a confocal microscopic image. Note that since rays from off-axis objects in the plane of interest give rise to collimated rays at an angle from the axis o, the side effect of additional length is also to limit the usable field in the image plane 47. This limitation, often referred to as "vignetting," can be circumvented by shifting the hologram normal to the optical axis o, thereby imaging the entire object plane.

In FIG. 4b, the same result is achieved but with a virtual image 42. The hologram 40 is placed at the lens 46 instead of being located at a distance of 2d away as in FIG. 4a. The image 45 is produced in the image plane 47.

Figure 5A:
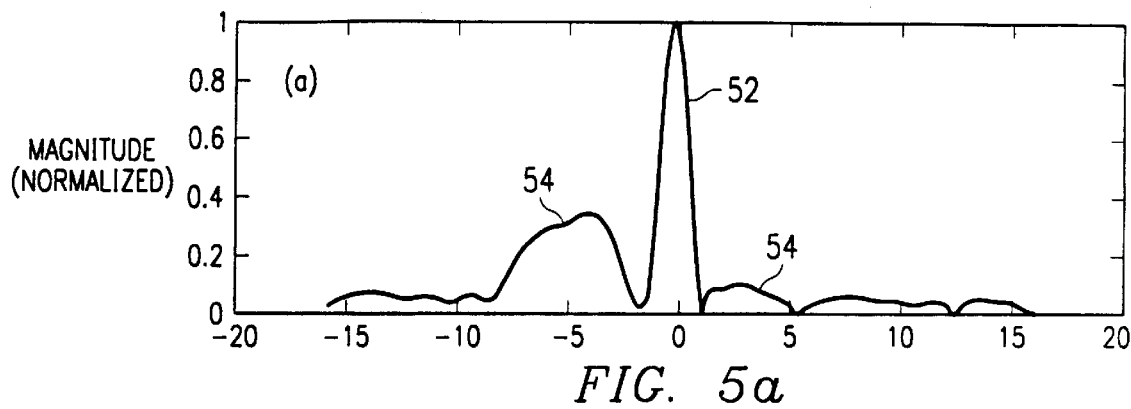
FIGS. 5a and 5b are graphic results of cross sections of a conventional hologram reconstruction and a hologram reconstructed using confocal microscopy techniques.
Figure 5B:
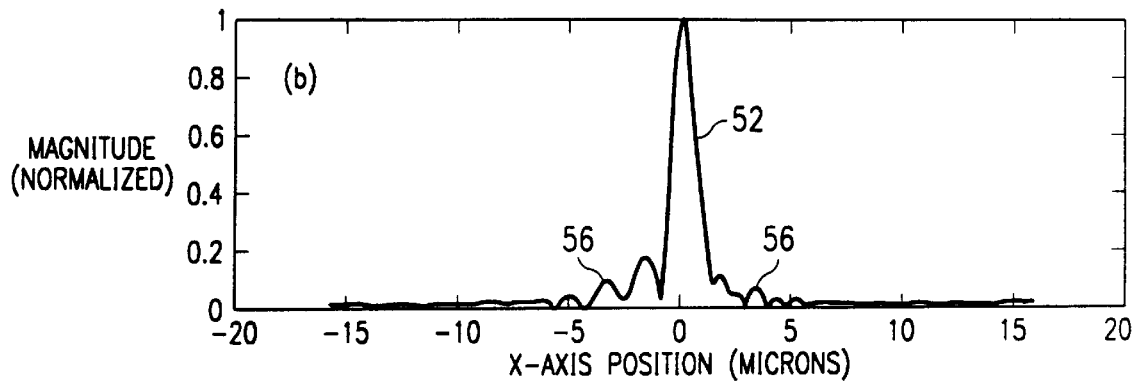

A graphical model of a cross section of the results obtained from the re-imaging techniques illustrated in FIG. 4a and FIG. 4b are reproduced in FIG. 5b. FIG. 5a represents a reconstructed conventional in-line hologram for the real inverted image 52 in the plane corresponding to the on-axis object. The off-axis, out-of-focus object 54 clearly confuses the view of the in-focus object and reduces contrast by raising the average amplitude away from either object. The collimated confocal reconstruction, the result of which is shown in FIG. 5b, attenuates this out-of-focus object 56, indicating improved depth resolution and greatly reducing the background, therefore improving the contrast. This may be seen by the reduced signal 56 on either side of the peak 52 indicating the improvement obtained in the re-imaged holographic image using collimated confocal reconstruction techniques.

Improved Holographic Image Reconstruction with Confocal Microscopy Techniques—Apertured Scanning Version While the collimated version of confocal hologram reconstruction shown in FIGS. 4a and 4b constitutes an improved method of re-imaging holograms in terms of depth discrimination and attenuation of twin images, its usefulness is best suited to sparse object distributions. As previously stated, such imaging techniques are often used when determining particulate patterns or patterns of droplets in turbulent flow. However, where the objects are nearly co-planar or nearly coaxial, there is still a need for a further improved technique for obtaining images with high depth resolution and improved contrast. To accomplish this result, the preferred embodiment of the present invention includes an aperture 60 in a scanning version of a confocal hologram reconstruction system 100. The inclusion of this aperture 60, which simulates the illumination pattern of the scanning confocal microscope, further improves both depth and lateral resolution as well as improving contrast in the re-imaged or reconstructed holographic image.

The beam waist aperture 60 design takes advantage of the coherent information associated with holography to enable maximum utilization of scanning confocal microscopy techniques.

Figure 6:
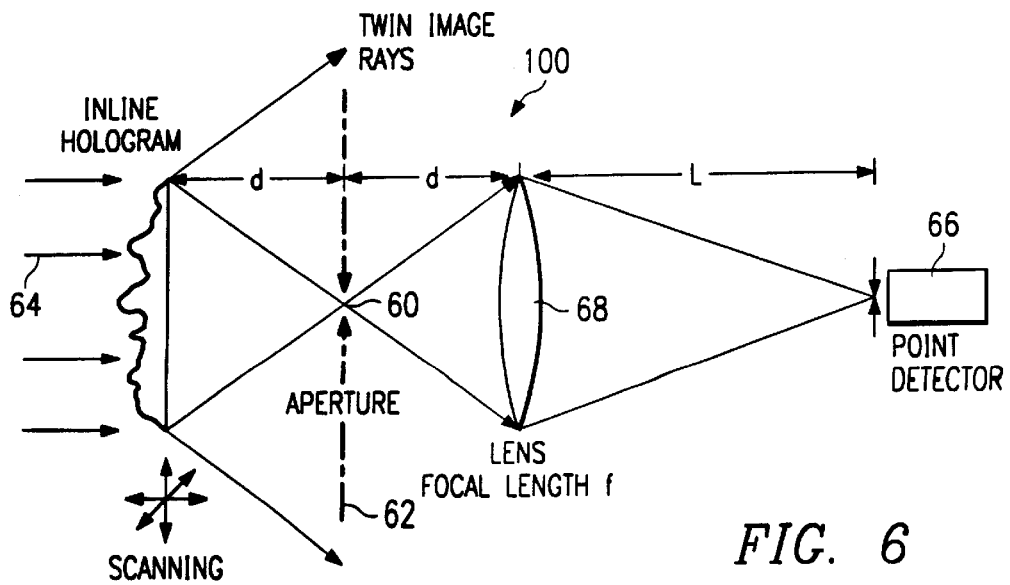
FIG. 6 is a schematic diagram of a scanning, apertured, confocal hologram reconstruction system.

By comparing the collimated version of the scanning confocal hologram reconstruction system of FIGS. 4a and 4b to the apertured version shown in FIG. 6, it will be seen that instead of collimating the output of the first collection lens 46 of the collimated confocal hologram reconstruction system shown in FIGS. 4a and 4b, the portion of the conventionally reconstructed holographic image which passes through the beam waist aperture 60 is instead refocused onto a distant aperture in a point detector 66. By analogy to the scanning confocal microscope shown in FIG. 3d and for the same reasons, the holographic recording must be scanned relative to the rest of the system to build up the final image point-by-point at the point detector 66 by recording the throughput for each position scanned (i.e., re-imaged). This configuration is shown in the schematic diagram of the apertured scanning version of the confocal hologram reconstruction device 100 shown in FIG. 6.

For the collimated version shown in FIG. 4a and FIG. 4b, the procedure is started by re-illuminating the in-line hologram. This re-illumination yields both real and twin holographic images. In the apertured version shown in FIG. 5, a beam waist aperture 60 is placed at the point in the virtual object space where probing is desired. The resulting wave amplitude is then propagated to the collection lens 68 and imaged onto an on-axis point or a pin-hole detector 66. Finally, the hologram itself is scanned such that other parts of the object distribution come into alignment with the collection system, forming what is hereinafter referred to as the confocal image.

Note that either the collimated version or the scanning apertured version may be applied in non-optical regimes by either simulating the elements of said methods (i.e., lens, aperture, wave propagation) or by converting the coherent recording into an optical element.

Another novel and useful feature of the confocal method of hologram reconstruction of the present invention is the added ability of time resolution. Specifically, the hologram may be formed by a short duration illumination of the object This is particularly important if part of the object is moving or surrounding conditions do not allow for long exposure. Then, when time is more plentiful the improved resolution and contrast obtainable from the use of scanning confocal microscopy techniques can be applied to the hologram.

Confocal Reconstruction of a Microwave Hologram

Figure 7:
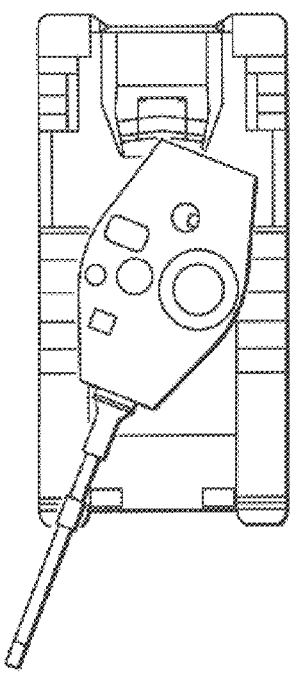
FIG. 7 is an overhead photograph of a combat tank model showing a turret and a cannon tube extending from the turret.

By using scanning confocal microscope reconstruction techniques, a microwave hologram of a combat tank model was reconstructed. FIG. 7 is an overhead photograph of a plan view of the combat tank model. The image of the combat tank model for a 45-degree elevation was refocused to a plane about 19 centimeters from the bottom of the tread portion of the combat tank model near its turret. To find the plane through the combat tank model turret, the cannon tube extending outwardly from the tank turret was used as a focusing guide since it had no confusing, out-of-focus objects behind it. However, since the cannon tube was pointed upwardly at an angle of about 20 degrees, it was not possible to simultaneously focus along the entire length of the cannon tube. Therefore, the lowest, inner-most portion of the cannon tube, where it attaches to the turret, was focused upon.

Eventually, by overlaying the reconstruction of the images from conventional and confocal reconstruction techniques onto a photograph of the combat tank model with the same scaling, the correlation between the signal and ground truth information in the reconstructed image from the optical version was analyzed. Such comparisons will appear in FIGS. 15 and 16.

Figure 8:
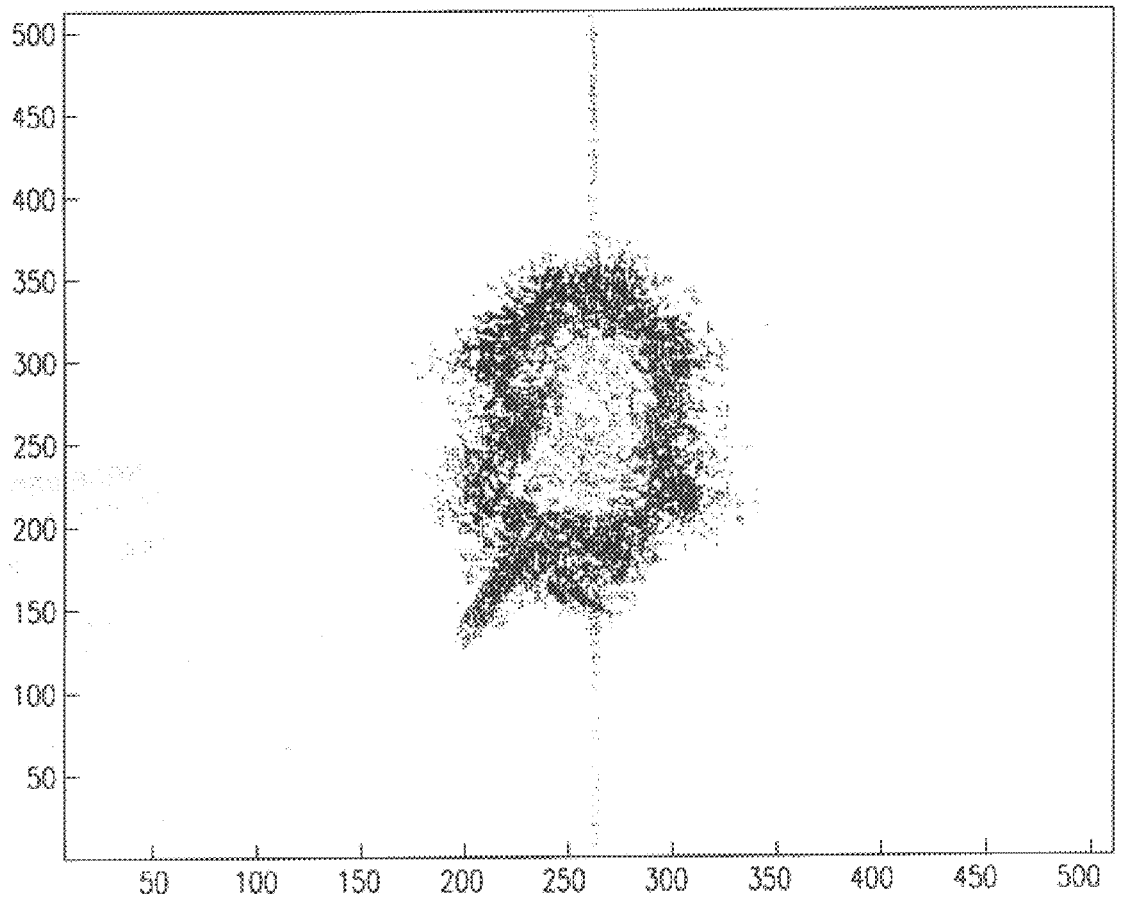
FIG. 8 is a log scale plot of the conventional reconstruction of the microwave hologram of the combat tank model of FIG. 7 after focusing on the base of the cannon tube where it connects to the turret.

In FIG. 8, a log scale plot of a conventional view, after focusing to the base of the cannon tube where it connects to the turret, is shown. This is the magnitude of the intermediate coherent data which represents the results by conventional means. The red portion shows the largest return signal, and the darker blue shows the smallest. The colors yellow and orange represent return signals between red and blue. White represents values which fall below a threshold of 20dB below the maximum. This intermediate coherent (magnitude and phase) data was used for the confocal processing shown in the following figures. The vertical line shown in FIG. 8 is a Fourier transform artifact and has been removed from the figures which follow.

Figure 9:
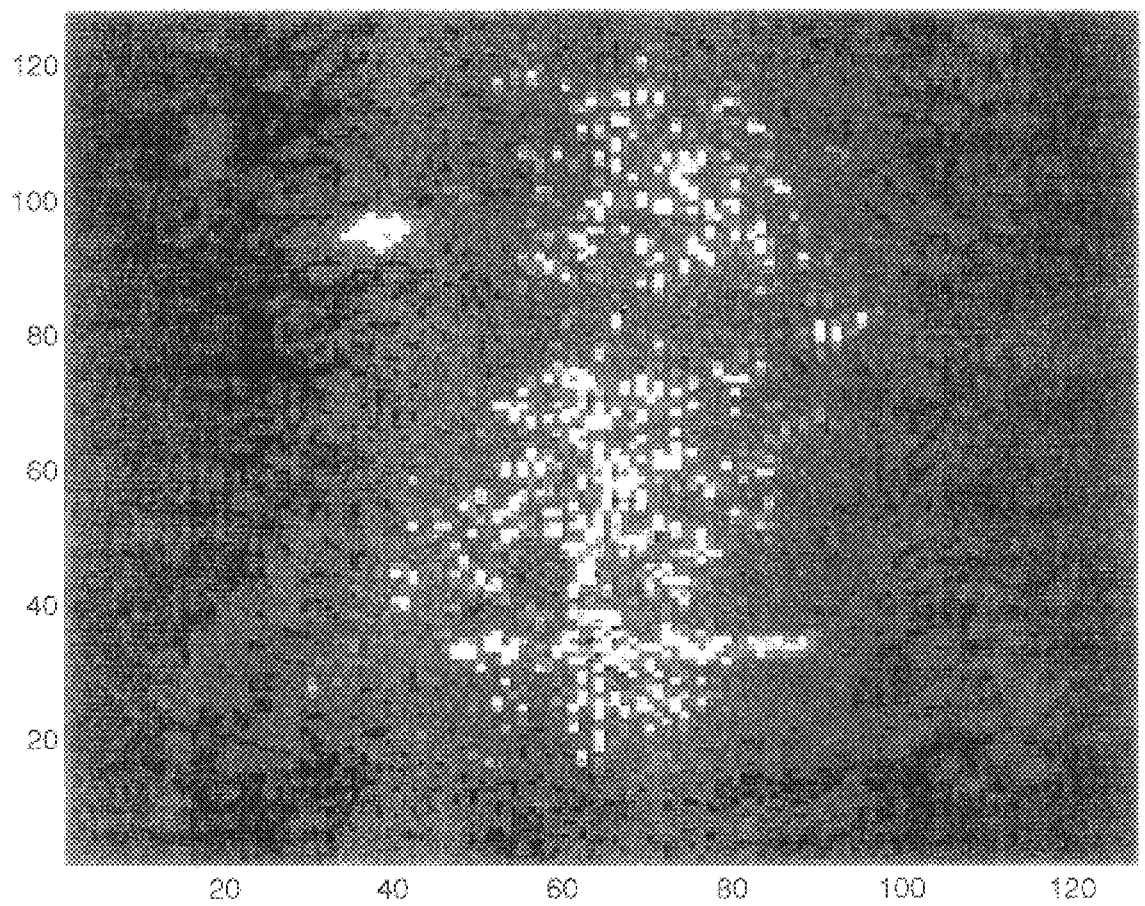
FIG. 9 is an enlarged version of FIG. 8 shown in linear scale.

In FIG. 9, the width of the entire view represents about 18 inches. This view is achieved by focusing on the base of the cannon tube where it meets the turret The horizontal lines near the bottom are due to the out-of-focus front face of the combat tank model which has a surface normal directed at about 45 degrees from either the vertical or horizontal. This surface produces a very strong monostatic return, or back-reflection. The strongest return signal is represented in red, and the weaker signals in blue. The orange and yellow represent return signals between the red and blue. Note the lack of any strong concentrations of return signals, giving the plot a sense of noise. The most prominent feature in the conventional reconstruction of FIG. 9 is an out-of-focus return caused by the front panel of the combat tank model pointing very nearly directly back at the receiver for the 45-degree monostatic configuration. Because of the strength of this signal, even while out-of-focus, it dominates the image.

Figure 10:
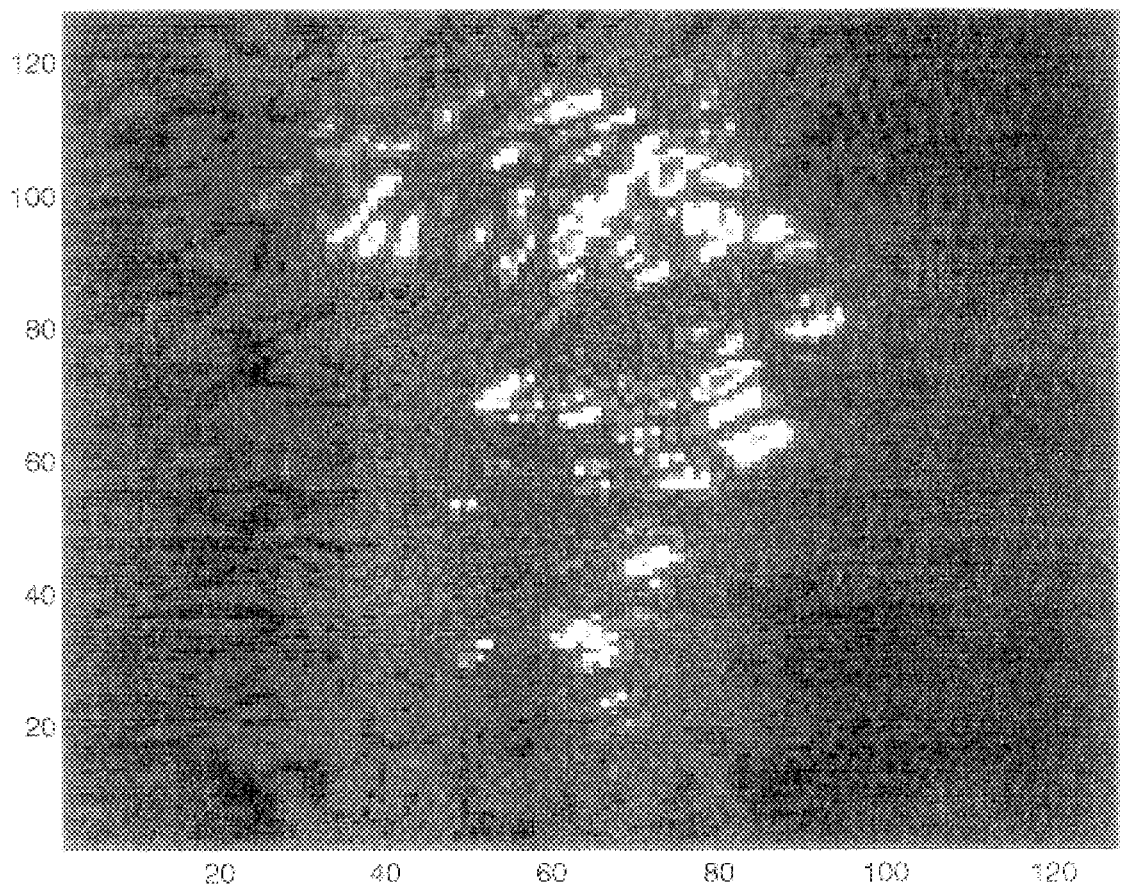
FIG. 10 is a plot of magnitude of the results of scanning confocal reconstruction of the coherent data shown in FIG. 9.

By comparison to FIG. 9, the confocal processing resulting in the color pattern shown in FIG. 10 not only removes the bar caused by the front panel of the combat tank model, but also clearly demonstrates some edge detail on the turret Even the portal on the top of the turret becomes visible, while the noise associated with the out-of-focus energy from other planes is greatly reduced. Note the strong return from the rear corner of the turret and from the inside corner made by the turret and the body of the combat tank with several after-images extending over the tank body. These after-images are probably due to multiple scattering events in the inside corner of the tank and turret body. This phenomena is commonly observed in microwave imaging. The reduction in the random array of return signals and the grouping of intensities of return signals indicates marked improvement in resolution.

Figure 11:
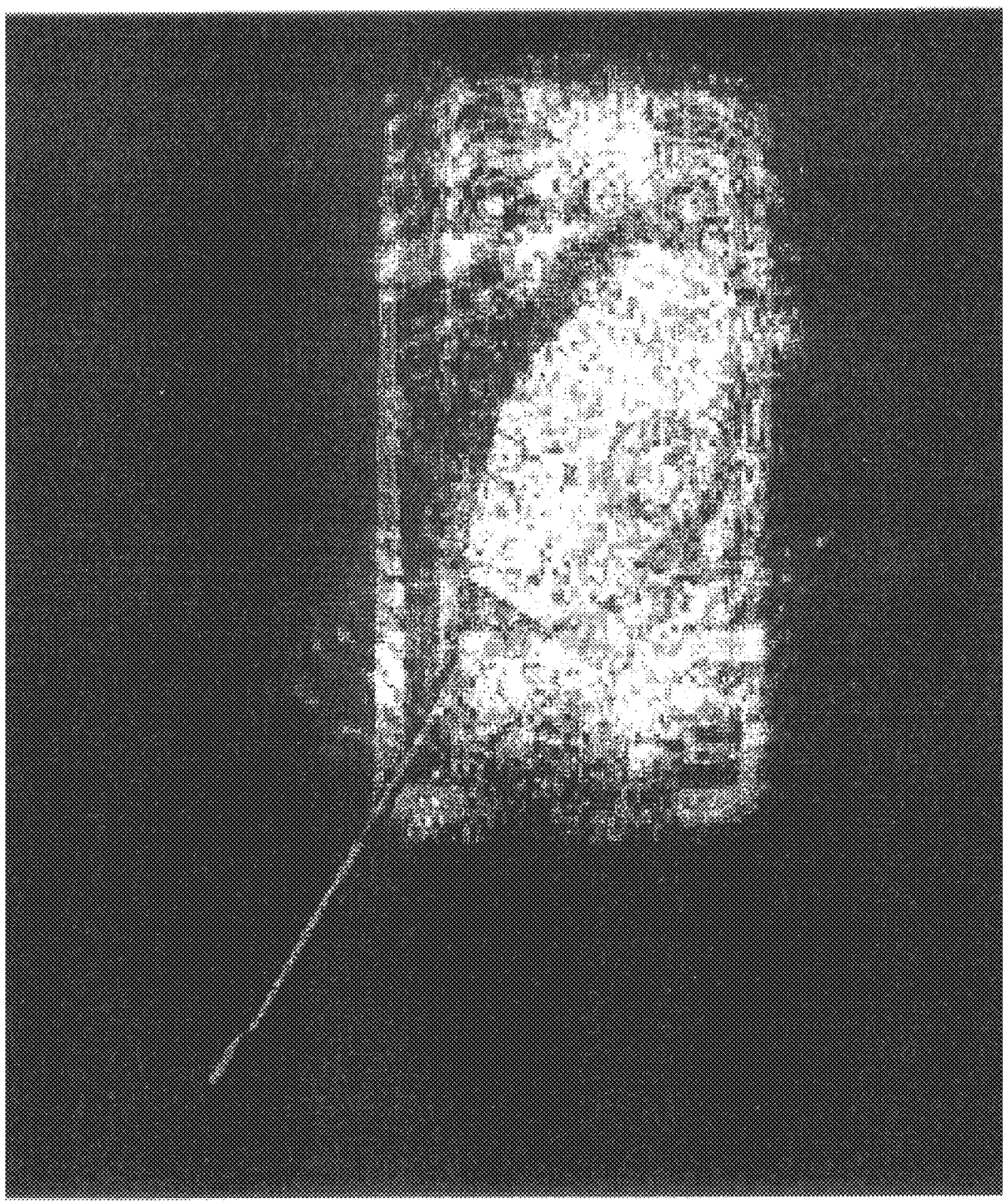
FIG. 11 is a photograph of the combat tank model of FIG. 7 with a semitransparent overlay of the conventional reconstruction shown in FIG. 9.

FIG. 11 is a photograph of the combat tank model with a semitransparent overlay of the conventional results refocused to the plane of the turret shown in FIG. 9. Note that the horizontal line corresponding to the 45-degree face plate at the front of the combat tank model appears wider and quite far from where it should be to correlate with that part of the combat tank model. This is because it is out of focus. Several less identifiable sources contribute to the noisy, seemingly random distribution of return signals.

Figure 12:
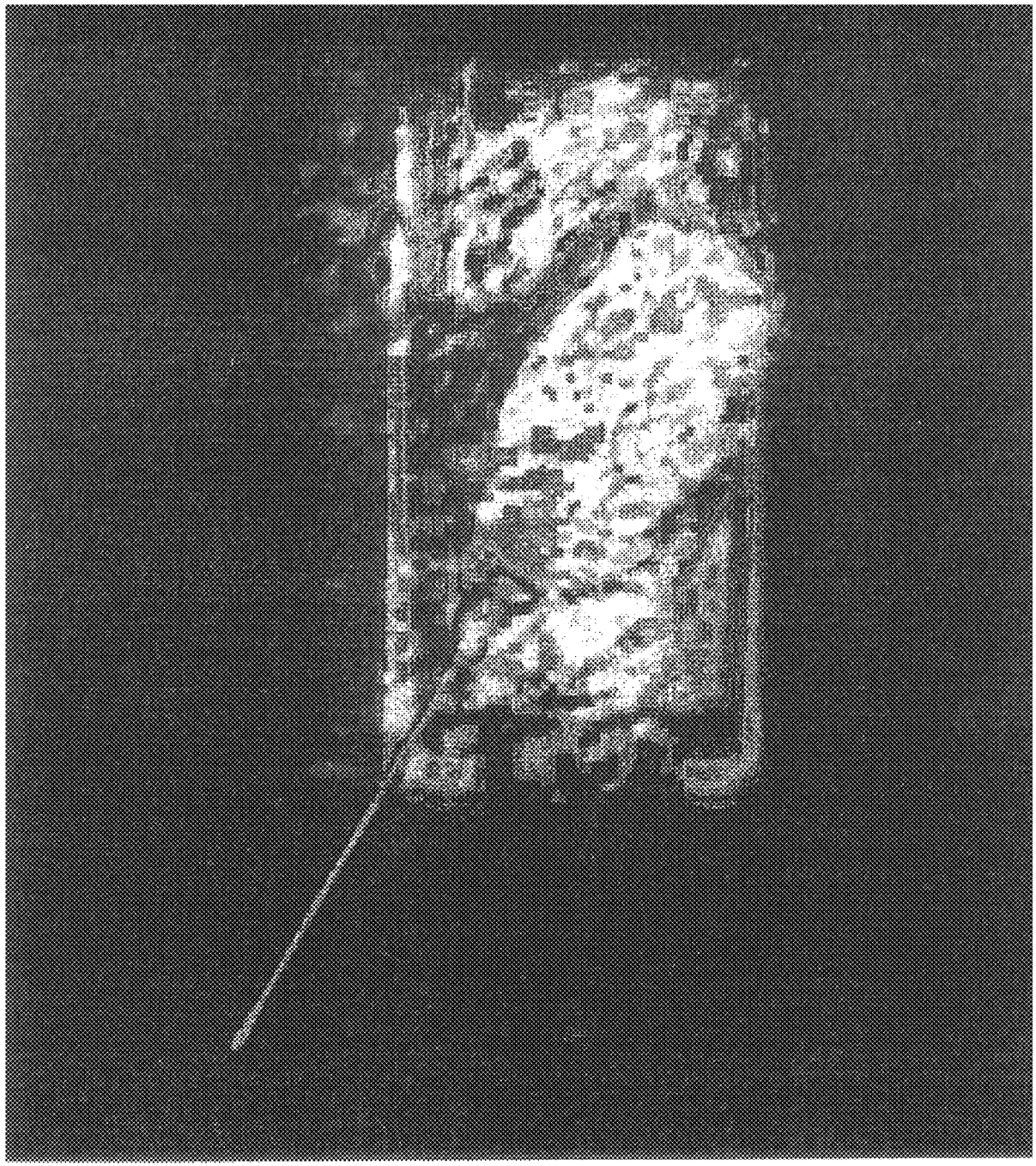
FIG. 12 is a photograph of the combat tank model of FIG. 7 with a semitransparent overlay of the scanning confocal reconstruction shown in FIG. 10.

FIG. 12 is a photograph of the combat tank model with a semitransparent overlay of the results of the confocal method applied to the intermediate reconstruction shown in FIG. 10. Note that the horizontal line corresponding to the 45-degree face plate at the front of the tank has been removed along with the obscuring signal from beyond the focal plane under consideration.

Conclusion

It has been shown that both the collimated and the apertured versions of confocal reconstruction techniques applied to holographic recordings, explained by the foregoing disclosure, may be used if the hologram is replaced by a spherical microwave hologram. Furthermore, the technique may be applied to the coherent intermediate image formed from: a coherent recording formed by ultrasound waves; a coherent recording formed by seismic waves; a coherent recording formed by sonar; a hologram formed by X-rays; a hologram formed by ultraviolet rays; and a coherent recording formed by infrared waves.

There is thereby provided by the present invention a system for improving the resolution and contrast associated with holographic images. Additionally, holographic imaging techniques may be used to record a snap-shot holographic image and confocal microscopy techniques then applied to produce a confusionless, 3-dimensional reconstruction of the holographic image with enhanced resolution and contrast.

It will be understood that while the invention disclosed herein has been described in terms of its preferred and alternate embodiments, other embodiments of the invention will become apparent to those of ordinary skill in the art. Such embodiments shall fall within the scope of the appended claims.

I claim:

1. A method for reconstructing a coherent recording comprising the steps of:

illuminating a coherent recording to obtain an intermediately formed spatial image;

positioning a beam waist aperture at the location of the intermediately formed spatial image;

selectively passing through waves from the intermediately formed spatial image using the beam waist aperture, wherein the beam waist aperture selectively passes through waves that represent a single point in the intermediately formed spatial image;

placing a collection lens after the beam waist aperture, wherein the collection lens is confocally arranged with the coherent recording and the beam waist aperture;

passing the waves from the beam waist aperture to the confocally arranged lens;

focusing the waves with the confocally arranged lens onto a point detector, wherein the point detector converts the focused waves to a signal;

associating the signal at the point detector with where the beam waist aperture and the coherent recording are located; and repositioning the coherent recording to obtain subsequent signals, wherein the subsequent signals create an image of the coherent recording.

2. The method as recited in claim 1, further comprising adjusting the location of the beam waist aperture along the optic axis relative to the lens and the point detector to build up three dimensional image information based on signals from the point detector.

3. The method as recited in claim 1, wherein the waves have a characteristic amplitude, and the point detector converts the waves into a signal based on the amplitude of the waves.

4. The method as recited in claim 1, wherein the waves have a characteristic phase, and the point detector converts the waves into a signal based on the phase of the waves.

5. The method as recited in claim 1, wherein the waves have a characteristic intensity, and the point detector converts the waves into a signal based on the intensity of the waves.

6. The method as recited in claim 1, wherein the waves have a characteristic frequency, and the point detector converts the waves into a signal based on the frequency of the waves.

7. The method as defined in claim 1 wherein the intermediately formed spatial image is an in-line holographic recording.

8. This method as defined in claim 1 wherein the intermediately formed spatial image is a spherical holographic recording.

9. The method as defined in claim 1 wherein the intermediately formed spatial image is formed by microwaves.

10. The method as defined in claim 1 wherein the intermediately formed spatial image is formed by ultrasound energy.

11. The method as defined in claim 1 wherein the intermediately formed spatial image is formed by sonar.

12. The method as defined in claim 1 wherein the intermediately formed spatial image is formed by seismic waves.

13. The method as defined in claim 1 wherein the intermediately formed spatial image is formed by X-rays.

14. The method as defined in claim 1 wherein the intermediately formed spatial image is formed by ultraviolet light.

15. The method as defined in claim 1 wherein the intermediately formed spatial image is formed by infrared light.

16. The method as defined in claim 1 further comprising digitizing the coherent recording for manipulation by a data processing system.

17. The method as defined in claim 1, wherein the positioning, placing, passing, and focusing steps are performed on a computer.

* * * * *